US008553886B2

(12) United States Patent  
Sakai et al.

(10) Patent No.: US 8,553,886 B2  
(45) Date of Patent: Oct. 8, 2013

(54) METHOD, SYSTEM, AND COMPUTER PRODUCT FOR MANAGING RADIO-TAG, MANAGING ADVERTISEMENT, AND USING RADIO TAG

(75) Inventors: Atsushi Sakai, Kawasaki (JP); Takayuki Hasebe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1828 days.

(21) Appl. No.: 11/516,274

(22) Filed: Sep. 6, 2006

(65) Prior Publication Data

US 2007/0233554 A1   Oct. 4, 2007

(30) Foreign Application Priority Data

Mar. 30, 2006 (JP) .................................. 2006-095081

(51) Int. Cl.  
*H04L 29/06* (2006.01)

(52) U.S. Cl.  
USPC .................................. 380/270; 726/9; 726/20

(58) Field of Classification Search  
USPC ............................ 726/9, 20; 380/270; 705/13  
See application file for complete search history.

(56) References Cited

U.S. PATENT DOCUMENTS

| | | | | |
|---|---|---|---|---|
| 6,609,656 | B1 * | 8/2003 | Elledge | 235/382 |
| 6,647,269 | B2 * | 11/2003 | Hendrey et al. | 455/456.3 |
| 6,678,866 | B1 * | 1/2004 | Sugimoto et al. | 715/203 |
| 6,820,062 | B1 * | 11/2004 | Gupta et al. | 705/16 |
| 6,880,753 | B2 * | 4/2005 | Ogihara et al. | 235/385 |
| 6,992,587 | B2 * | 1/2006 | Maeda et al. | 340/572.1 |
| 7,209,041 | B2 * | 4/2007 | Hines et al. | 340/572.4 |
| 7,240,834 | B2 * | 7/2007 | Kato et al. | 235/385 |
| 7,345,587 | B2 * | 3/2008 | Bremer | 340/572.7 |
| 7,374,096 | B2 * | 5/2008 | Overhultz et al. | 235/487 |
| 7,407,099 | B1 * | 8/2008 | Bhatti et al. | 235/385 |
| 7,542,942 | B2 * | 6/2009 | Peart et al. | 705/39 |
| 7,543,738 | B1 * | 6/2009 | Saunders et al. | 235/380 |
| 7,549,579 | B2 * | 6/2009 | Overhultz et al. | 235/383 |
| 7,568,211 | B2 * | 7/2009 | Mai et al. | 725/35 |
| 7,571,124 | B2 * | 8/2009 | Bodin | 705/27.1 |
| 7,606,533 | B2 * | 10/2009 | Perttila et al. | 455/41.2 |
| 7,620,568 | B1 * | 11/2009 | Parker-Malchak | 705/23 |

(Continued)

FOREIGN PATENT DOCUMENTS

| JP | 2003-224677 | 8/2003 |
|---|---|---|
| JP | 2006-072645 A | 3/2006 |

OTHER PUBLICATIONS

Japanese Notice of Rejection, English-language translation, mailed Dec. 7, 2010 for corresponding Japanese corresponding Application No. 2006-095081.

*Primary Examiner* — David Garcia Cervetti  
(74) *Attorney, Agent, or Firm* — Fujitsu Patent Center

(57) ABSTRACT

An advertisement management device generates and manages advertisement information and an advertisement identifier, a tag management unit generates a tag identifier and tag information unique to the tag identifier, and manages the tag identifier, the tag information, and the advertisement identifier generated by the advertisement management device in associated manner. The tag management unit sends the tag identifier and the advertisement identifier to the radio tag. A reader reads the tag identifier and the advertisement identifier from the radio tag, sends the tag identifier to the tag management unit, and sends the advertisement identifier to the advertisement management unit. The tag management unit sends tag information corresponding to the tag identifier received from the reading unit to a display unit, and the advertisement management unit sends advertisement information corresponding to the advertisement identifier received from the reading unit to the display unit.

19 Claims, 14 Drawing Sheets

(56) References Cited

U.S. PATENT DOCUMENTS

| | | | |
|---|---|---|---|
| 7,737,824 B2* | 6/2010 | Aikawa et al. | 340/10.4 |
| 2002/0052839 A1* | 5/2002 | Takatori | 705/39 |
| 2002/0065680 A1* | 5/2002 | Kojima et al. | 705/1 |
| 2002/0116268 A1* | 8/2002 | Fukuda | 705/14 |
| 2002/0138347 A1* | 9/2002 | Sakata | 705/14 |
| 2003/0033202 A1* | 2/2003 | Ogawa et al. | 705/14 |
| 2003/0085276 A1* | 5/2003 | Ogihara et al. | 235/385 |
| 2003/0097302 A1* | 5/2003 | Overhultz et al. | 705/14 |
| 2004/0044564 A1* | 3/2004 | Dietz et al. | 705/10 |
| 2004/0044571 A1* | 3/2004 | Bronnimann et al. | 705/14 |
| 2004/0056091 A1* | 3/2004 | Overhultz et al. | 235/382 |
| 2004/0103028 A1* | 5/2004 | Littman et al. | 705/14 |
| 2004/0164844 A1* | 8/2004 | Maeda et al. | 340/5.8 |
| 2004/0186768 A1* | 9/2004 | Wakim et al. | 705/14 |
| 2004/0193742 A1* | 9/2004 | Ikeda | 710/1 |
| 2004/0249712 A1* | 12/2004 | Brown et al. | 705/14 |
| 2005/0035860 A1* | 2/2005 | Taylor et al. | 340/572.1 |
| 2005/0038718 A1* | 2/2005 | Barnes et al. | 705/28 |
| 2005/0068170 A1* | 3/2005 | Aupperle et al. | 340/539.15 |
| 2005/0093698 A1* | 5/2005 | Sakamoto et al. | 340/572.1 |
| 2005/0095573 A1* | 5/2005 | Overhultz et al. | 434/365 |
| 2005/0149387 A1* | 7/2005 | O'Shea et al. | 705/14 |
| 2005/0149391 A1* | 7/2005 | O'Shea et al. | 705/14 |
| 2005/0149414 A1* | 7/2005 | Schrodt et al. | 705/29 |
| 2005/0154919 A1* | 7/2005 | Noguchi et al. | 713/201 |
| 2005/0167493 A1* | 8/2005 | Barton et al. | 235/383 |
| 2005/0178832 A1* | 8/2005 | Higuchi | 235/440 |
| 2005/0216822 A1* | 9/2005 | Kyusojin et al. | 715/501.1 |
| 2005/0240610 A1* | 10/2005 | Tani et al. | 707/101 |
| 2005/0242922 A1* | 11/2005 | Sakamoto et al. | 340/5.61 |
| 2005/0258961 A1* | 11/2005 | Kimball et al. | 340/572.1 |
| 2005/0273385 A1* | 12/2005 | Vandervoort | 705/14 |
| 2006/0015408 A1* | 1/2006 | Brown | 705/22 |
| 2006/0020513 A1* | 1/2006 | Nagano et al. | 705/14 |
| 2006/0136292 A1* | 6/2006 | Bhati et al. | 705/14 |
| 2006/0208070 A1* | 9/2006 | Kato et al. | 235/383 |
| 2006/0231611 A1* | 10/2006 | Chakiris et al. | 235/380 |
| 2006/0253416 A1* | 11/2006 | Takatsu et al. | 707/1 |
| 2006/0287976 A1* | 12/2006 | Sakata | 707/1 |
| 2007/0019616 A1* | 1/2007 | Rantapuska et al. | 370/352 |
| 2007/0113241 A1* | 5/2007 | Mai et al. | 725/10 |
| 2007/0156517 A1* | 7/2007 | Kaplan et al. | 705/14 |
| 2007/0176750 A1* | 8/2007 | Sakai et al. | 340/10.4 |
| 2007/0182555 A1* | 8/2007 | Walker et al. | 340/572.1 |
| 2007/0190941 A1* | 8/2007 | Fein et al. | 455/41.2 |
| 2007/0192189 A1* | 8/2007 | Popowich et al. | 705/14 |
| 2007/0197261 A1* | 8/2007 | Humbel | 455/558 |
| 2007/0203796 A1* | 8/2007 | Riggs, III | 705/18 |
| 2007/0276734 A1* | 11/2007 | Littman | 705/14 |
| 2008/0095354 A1* | 4/2008 | O'Connor et al. | 379/265.01 |
| 2008/0309461 A1* | 12/2008 | Mizuki et al. | 340/10.1 |

* cited by examiner

FIG.3

| REGISTER ID | ADVERTISEMENT TYPE | ADVERTISEMENT INFORMATION | ADVERTISER INFORMATION | CONTRACT CONDITION | ISSUED ADVERTISEMENT ID |
|---|---|---|---|---|---|
| R0000 | CABBAGE | "RECIPE FOR CABBAGE DISH (HOI-KO-RO)⋯ SOURCE FOR HOI-KO-RO OF A FOODS⋯" | A FOODS a@x.com | 1 YEN/ DISPLAY | I0001,I0002,⋯ |
| R0001 | NOODLE | "RECIPE FOR NOODLE DISH⋯ SOURCE FOR NOODLE OF B FOODS⋯" | B FOODS b@y.com | 5 YEN/ DISPLAY | I0011,I0012,⋯ |
| ⋯ | ⋯ | ⋯ | ⋯ | ⋯ | ⋯ |

FIG.4

| ADVERTISEMENT ID | REGISTER ID | ADDRESS OF RADIO-TAG MANAGEMENT DEVICE | NUMBER OF ACCESSES |
|---|---|---|---|
| I0001 | R0000 | 111.000.111.000 | 100,000 |
| I0002 | R0000 | 000.111.000.111 | 200,000 |
| ⋮ | ⋮ | ⋮ | ⋮ |

FIG.5

| TAG ID | PURCHASER INFORMATION | TAG INFORMATION (CONTAINING TRACEABILITY INFORMATION) | ADVERTISEMENT ID |
|---|---|---|---|
| T0001 | C FARM c@z.com | ITEM: CABBAGE PRODUCER: C FARM ⋮ | I0001 |
| T0002 | C FARM c@z.com | ITEM: CABBAGE PRODUCER: C FARM ⋮ | I0001 |
| ⋮ | ⋮ | ⋮ | ⋮ |

FIG.6

| ITEM TYPE | ADDRESS OF ADVERTISEMENT MANAGEMENT DEVICE | ADVERTISEMENT ID | NUMBER OF ACCESSES | CONTRACT CONDITION | CHARGES TO BE COLLECTED |
|---|---|---|---|---|---|
| CABBAGE | 222.333.222.333 | I0001 | 100,000 | 1 YEN/DISPLAY | ¥100,000 |
| NOODLE | 222.333.222.333 | I0011 | 200,000 | 5 YEN/DISPLAY | ¥1,000,000 |
| ... | ... | ... | ... | ... | ... |

FIG.7

■TRACEABILITY INFORMATION

ITEM: CABBAGE
PRODUCER: C FARM (O× TARO)
PRODUCTION AREA: KAWASAKI-SHI, KANAGAWA PREFECTURE
PRODUCTION METHOD: CULTIVATION USING REDUCED AMOUNTS OF PESTICIDES (JAS...)
...

■RECIPE FOR CABBAGE DISH (HOI-KO-RO):

INGREDIENT:...

■SOURCE FOR HOI-KO-RO OF A FOODS:

COPY OF ADVERTISEMENT

} ADVERTISEMENT

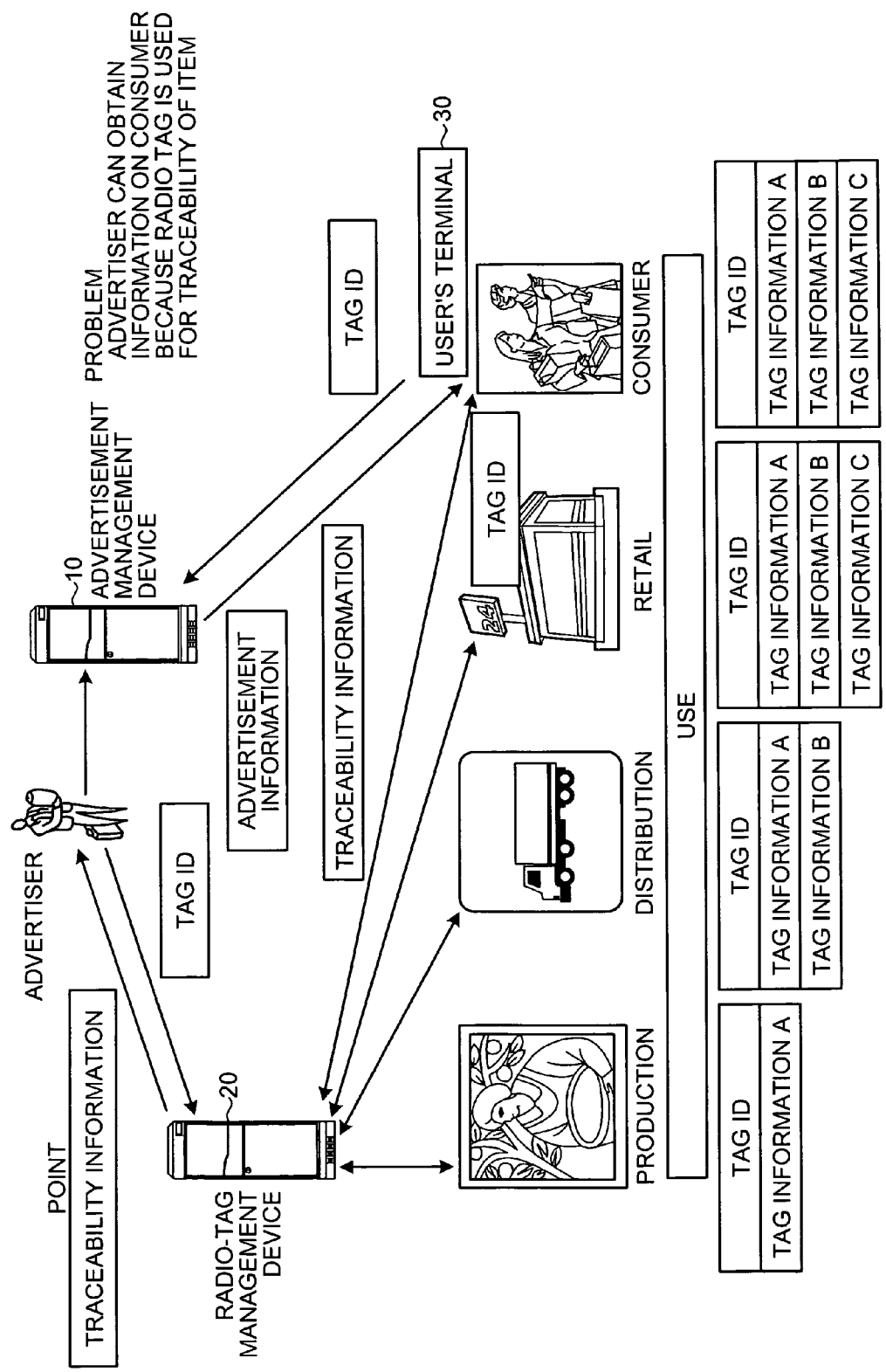

METHOD, SYSTEM, AND COMPUTER PRODUCT FOR MANAGING RADIO-TAG, MANAGING ADVERTISEMENT, AND USING RADIO TAG

BACKGROUND OF THE INVENTION

1. Field of the Invention

The present invention generally relates to management of a radio tag, and specifically relates to display of information on a terminal about an item to which a radio tag has been attached.

2. Description of the Related Art

Radio tags have already been widely used. To promote the radio tags further, it is necessary to reduce the cost of the radio tags. One approach to reduce the cost of the radio tags, apart from reducing the production costs or the costs for attaching the radio tags to items, is to produce revenue from the radio tags. One approach to produce such revenue is to display on a terminal an advertisement of the item, to which a radio tag is attached, when a customer is interested in that item.

For example, advertisements and tag IDs can be managed in a database, and when a customer tries to check the traceability information of a radio tag, an advertisement associated with a tag ID of that radio tag can be displayed on a terminal for the purchaser to see.

Japanese Patent Application Laid-Open No. 2003-224677 discloses a technology in which a radio tag communicates with a mobile telephone and causes the mobile telephone to display an advertisement.

In the conventional technology, however, private information can leak. Why and how the private information can leak is explained below with reference to FIG. 16.

As shown in FIG. 16, a radio-tag management device 20 manages tag information and tag IDs in associated manner for a plurality of radio tags. Each of the radio tag stores therein tag information relevant to itself along with its own tag ID.

For example, when the radio tag is in a production stage, only tag information A that is required in the production stage is stored in the radio tag. When the radio tag is in a distribution stage, only tag information B that is required in the distribution stage is stored in the radio tag. The radio-tag management device 20 manages all the tag information, such as tag information A, tag information B, tag information C, for all the radio tags for all the stages. As the stages change, tag information corresponding to the new stage is overwritten on the tag information of the previous stage in the radio tag. The tag information stored in a radio tag includes traceability information relating to an item to which the radio tag is attached. The traceability information includes information relating to producer and/or seller of the item.

An advertisement management device 10 manages tag IDs and advertisements in an associated manner for all the radio tags. Assume that a customer becomes interested in an item and tries to check traceability information, which is stored in a radio tag attached to the item, of the item by using a user's terminal 30. In this case, a tag ID of the radio tag attached to the item is sent to the advertisement management device 10 and the advertisement associated with the tag ID is fetched from the advertisement management device 10, and the advertisement is displayed on the user's terminal 30 together with the traceability information.

However, because the tag IDs are managed on the advertisement management device 10, a person who has access to the advertisement management device 10 can readily and fraudulently acquire traceability information of all the radio tags. Thus, the traceability information, which is private information, can readily leak to a third party.

Thus, there is a need of a technology that can prevent leakage of personal information in a radio tag system.

SUMMARY OF THE INVENTION

It is an object of the present invention to at least partially solve the problems in the conventional technology.

According to an aspect of the present invention, a computer-readable recording medium stores a computer program causes a computer to manage information on a radio tag, the computer program causes the computer to execute requesting issue of an advertisement identifier for identifying an advertisement, to an advertisement management device which manages the advertisement to be displayed in addition to tag information when a user's terminal displays the tag information, the user's terminal being used by a purchaser of an item attached with a radio tag; receiving the advertisement identifier requested in the advertisement-identifier-issue requesting step from the advertisement management device, and storing the advertisement identifier associated with a tag identifier in a storage device; and writing the advertisement identifier stored in the storage device in the advertisement-identifier storing step, to the radio tag to which the corresponding tag identifier has been written so that the advertisement identifier can be read from the radio tag and specified when the user's terminal requests the advertisement to the advertisement management device.

According to another aspect of the present invention, a radio-tag management method for managing information on a radio tag includes requesting issue of an advertisement identifier for identifying an advertisement, to an advertisement management device which manages the advertisement to be displayed in addition to tag information when a user's terminal displays the tag information, the user's terminal being used by a purchaser of an item attached with a radio tag; receiving the advertisement identifier requested in the advertisement-identifier-issue requesting step from the advertisement management device, and storing the advertisement identifier associated with a tag identifier in a storage device; and writing the advertisement identifier stored in the storage device in the advertisement-identifier storing step, to the radio tag to which the corresponding tag identifier has been written so that the advertisement identifier can be read from the radio tag and specified when the user's terminal requests the advertisement to the advertisement management device.

According to still another aspect of the present invention, a radio-tag management device that manages information on a radio tag includes an advertisement-identifier-issue requesting unit that requests issue of an advertisement identifier for identifying an advertisement, to an advertisement management device which manages the advertisement to be displayed in addition to tag information when a user's terminal displays the tag information, the user's terminal being used by a purchaser of an item attached with a radio tag; an advertisement-identifier storage unit that receives the advertisement identifier requested by the advertisement-identifier-issue requesting unit from the advertisement management device, and stores the advertisement identifier associated with a tag identifier in a storage device; and an advertisement-identifier writing unit that writes the advertisement identifier stored in the storage device by the advertisement-identifier storage unit, to the radio tag to which the corresponding tag identifier has been written so that the advertisement identifier can be read from the radio tag and specified when the user's terminal requests the advertisement to the advertisement management device.

According to still another aspect of the present invention, a computer-readable recording medium that stores a computer program causes a computer to manage advertisement, the computer program causes the computer to execute issuing an advertisement identifier for identifying an advertisement in response to a request from a radio-tag management device which manages information on a radio tag, the advertisement being displayed in addition to tag information when a user's terminal displays the tag information, the user's terminal being used by a purchaser of an item attached with a radio tag; and transmitting an advertisement in response to a transmission request of the advertisement corresponding to the advertisement identifier sent from the user's terminal which reads the advertisement identifier from the radio tag when the tag information for the radio tag is displayed, the radio tag to which the advertisement identifier issued in the advertisement-identifier issuing step has been written by the radio-tag management device.

According to still another aspect of the present invention, a computer-readable recording medium that stores a computer program manages a user's terminal, the computer program causes the computer to execute reading an advertisement identifier for identifying an advertisement related to an item attached with a radio tag, from the radio tag; requesting transmission of an advertisement to an advertisement management device which manages the advertisement associated with the advertisement identifier corresponding to read advertisement identifier; and displaying an advertisement received from the advertisement management device along with tag information.

According to still another aspect of the present invention, a method of using a radio tag includes an advertisement management device issuing an advertisement identifier for identifying an advertisement, the advertisement management device managing the advertisement displayed together with tag information by a user's terminal used by a purchaser of an item attached with a radio tag; a radio-tag management device, which manages information on a radio tag, writing the advertisement identifier issued at the advertisement-identifier issuing step, to the radio tag; and the user's terminal reading the advertisement identifier written to the radio tag at the writing, receiving the advertisement corresponding to the advertisement identifier from the advertisement management device, and displaying the advertisement together with the tag information.

According to still another aspect of the present invention, a method of managing advertisement includes issuing an advertisement identifier for identifying an advertisement in response to a request from a radio-tag management device which manages information on a radio tag, the advertisement being displayed in addition to tag information when a user's terminal displays the tag information, the user's terminal being used by a purchaser of an item attached with a radio tag; and transmitting an advertisement in response to a transmission request of the advertisement corresponding to the advertisement identifier sent from the user's terminal which reads the advertisement identifier from the radio tag when the tag information for the radio tag is displayed, the radio tag to which the advertisement identifier issued in the advertisement-identifier issuing step has been written by the radio-tag management device.

According to still another aspect of the present invention, a device for managing advertisement includes an issuing unit that issues an advertisement identifier for identifying an advertisement in response to a request from a radio-tag management device which manages information on a radio tag, the advertisement being displayed in addition to tag information when a user's terminal displays the tag information, the user's terminal being used by a purchaser of an item attached with a radio tag; and a transmitting unit that transmits an advertisement in response to a transmission request of the advertisement corresponding to the advertisement identifier sent from the user's terminal which reads the advertisement identifier from the radio tag when the tag information for the radio tag is displayed, the radio tag to which the advertisement identifier issued in the advertisement-identifier issuing step has been written by the radio-tag management device.

According to still another aspect of the present invention, an apparatus for managing a user's terminal includes a reading unit that reads an advertisement identifier for identifying an advertisement related to an item attached with a radio tag, from the radio tag; a requesting unit that requests transmission of an advertisement to an advertisement management device which manages the advertisement associated with the advertisement identifier corresponding to read advertisement identifier; and a displaying unit that displays an advertisement received from the advertisement management device along with tag information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 depicts an example of the contents of an advertisement-content table shown in FIG. 2;

FIG. 4 depicts an example of the contents of an advertisement-ID management table shown in FIG. 2;

FIG. 5 depicts an example of the contents of a tag-information table shown in FIG. 2;

FIG. 6 depicts an example of the contents of an advertisement management table shown in FIG. 2;

FIG. 7 depicts an example of display by a tag-information display unit shown in FIG. 2;

FIG. 16 is a schematic for explaining the problems in the conventional technology.

DETAILED DESCRIPTION OF THE PREFERRED EMBODIMENTS

Exemplary embodiments of the present invention are explained in detail below with reference to the attached drawings. Embodiments of the present invention are explained below by taking a food product as an example of an item; however, the embodiments can be similarly applied to any other product.

Figure 1:
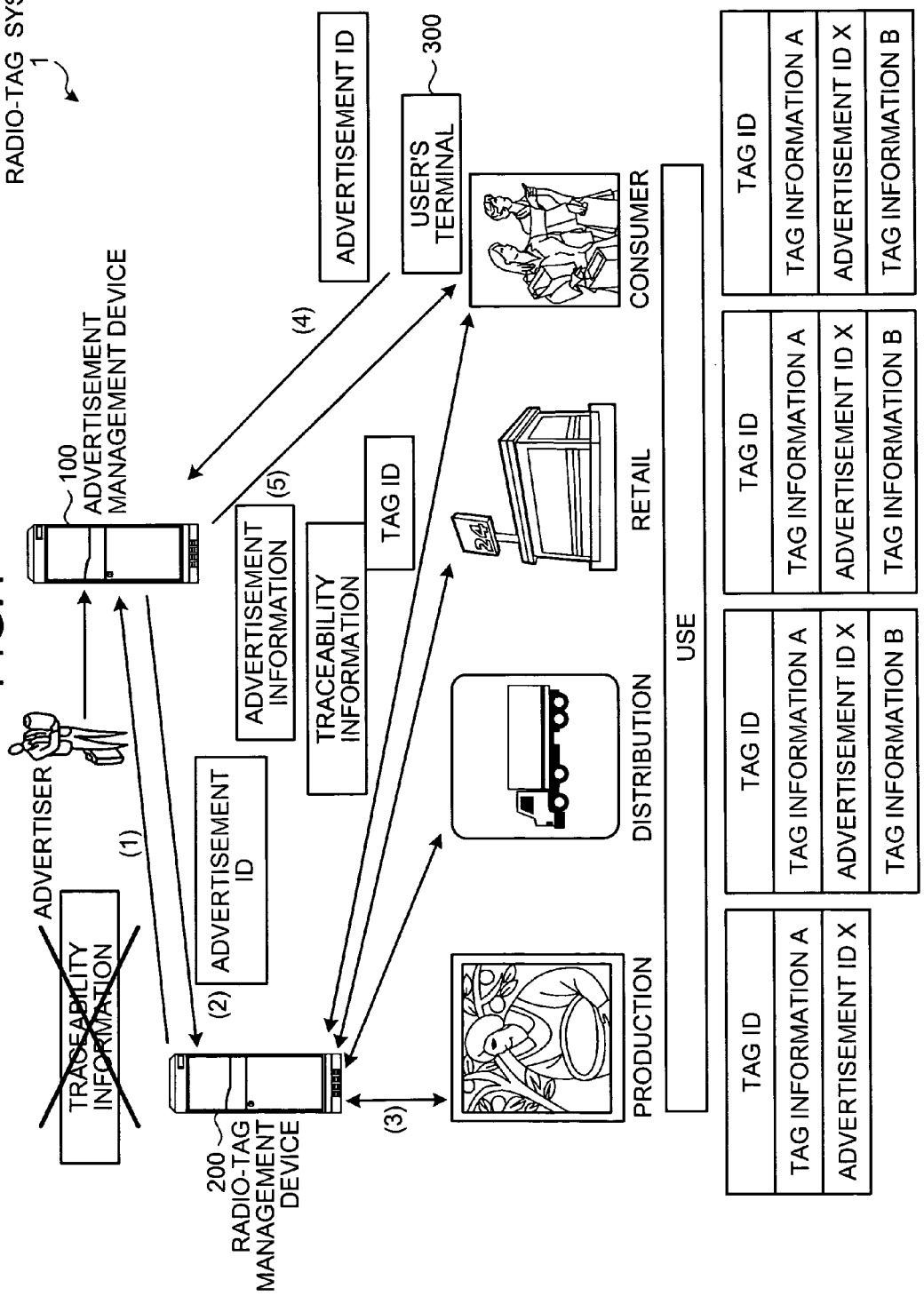
FIG. 1 is a schematic for explaining the method of preventing leakage of traceability information in a radio-tag system according to an embodiment of the present invention.

FIG. 1 is a schematic for explaining the method of preventing leakage of traceability information in a radio-tag system 1 according to an embodiment.

The radio-tag system 1 includes a radio-tag management device 200, an advertisement management device 100, and a user terminal 300. The radio-tag management device 200 requests issue of an advertisement ID for identifying an advertisement related to an item to be attached with a radio tag, to an advertisement management device 100 (see (1) if FIG. 1), and the advertisement management device 100 issues the advertisement ID (see (2)).

The radio-tag management device 200 manages the advertisement ID, issued by the advertisement management device 100, associated with the tag ID, and writes the advertisement ID to the radio tag when space becomes available in a storage area of the radio tag (see (3)). Therefore, for example, when a radio tag is in a production stage, the radio tag stores therein its own tag ID, tag information A, and advertisement ID.

The advertisement management device 100 manages the advertisement ID and advertisement information is associated manner. The user's terminal 300 is generally possessed by a customer and includes a tag reader that can read information in a radio tag. Assume that a consumer becomes interested in an item and operates the user's terminal 300 and reads information present in the radio tag attached to the item. In this case, the user's terminal 300 reads a tag ID, tag information A, and advertisement ID from the radio tag, sends the tag ID to the radio-tag management device 200 and requests the radio-tag management device 200 to send traceability information corresponding to the tag ID in return, sends the advertisement ID to the advertisement management device 100 and requests the advertisement management device 100 to send advertisement information corresponding to the advertisement ID in return (see (4)).

As a result, the radio-tag management device 200 transmits the traceability information to the user's terminal 300 and the advertisement management device 100 transmits the advertisement information to the user's terminal 300 (see (5)). The user's terminal 300 displays the traceability information together with the advertisement information.

As described above, in the radio-tag system 1, the advertisement management device 100 manages the advertisement ID associated with the advertisement information, instead of management of the tag ID associated with the advertisement information. Therefore, because the advertisement management device 100 does not manage tag IDs, the possibility of leakage of traceability information can be eliminated.

Figure 2:
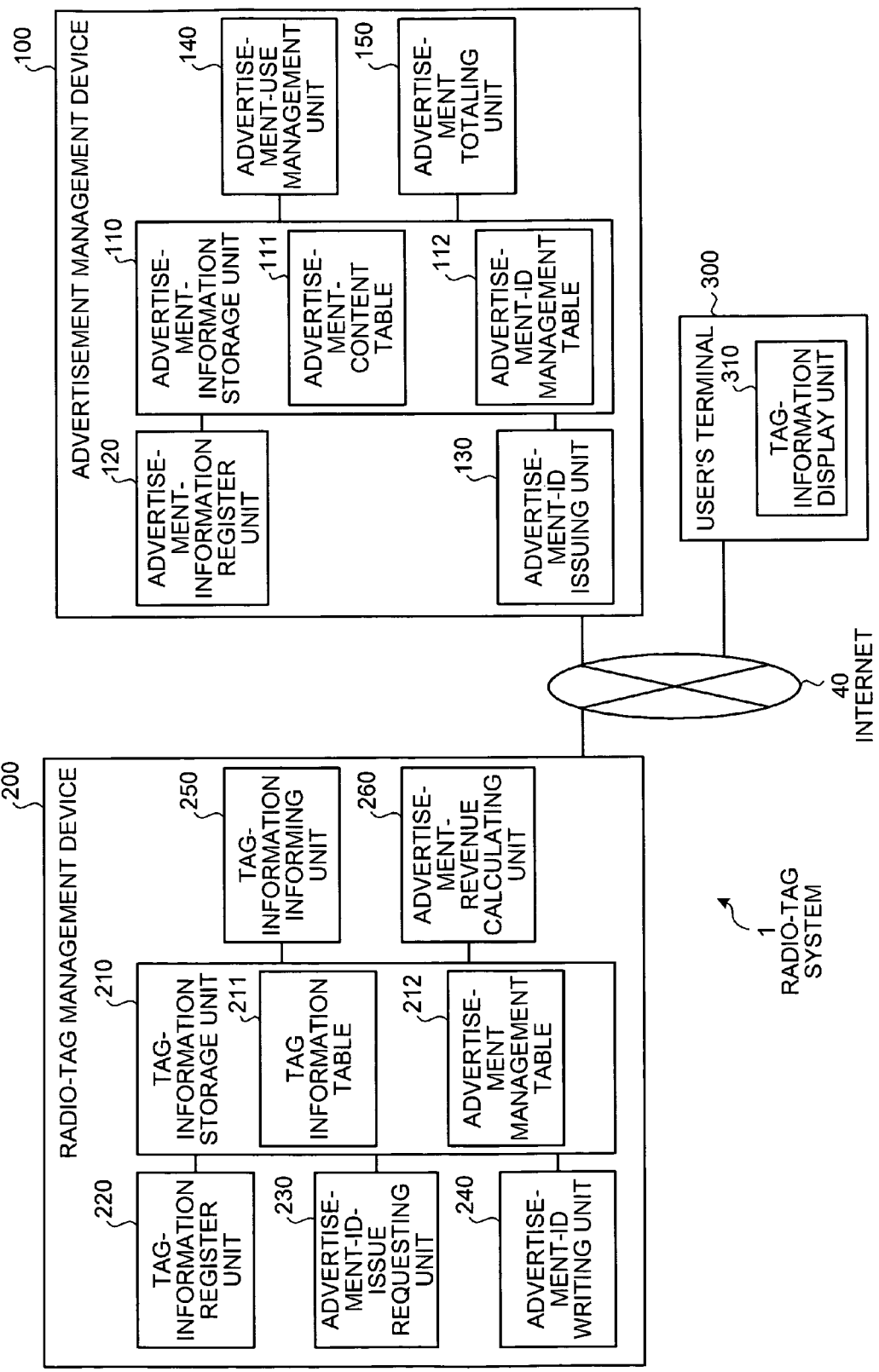
FIG. 2 is a detailed functional block diagram the radio-tag system shown in FIG. 1.

FIG. 2 is a detailed functional block diagram of the radio-tag system 1. The radio-tag system 1 includes the advertisement management device 100, the radio-tag management device 200, and the user's terminal 300 connected to one another through the Internet 40.

For convenience in explanation, only one unit of the advertisement management device 100 and one unit of the user's terminal 300 are shown here, but the radio-tag system 1 can include a plurality of advertisement management devices 100 and a plurality of user's terminals 300.

The advertisement management device 100 is a device that manages advertisements, and includes an advertisement-information storage unit 110, an advertisement-information register unit 120, an advertisement-ID issuing unit 130, an advertisement-use management unit 140, and an advertisement totaling unit 150.

The advertisement-information storage unit 110 is a storage unit that stores information for managing advertisements, and includes an advertisement-content table 111 and an advertisement-ID management table 112.

The advertisement-content table 111 is a table that stores information on advertisements. FIG. 3 depicts an example of the contents of the advertisement-content table 111. The advertisement-content table 111 stores therein data associated with one another, for each advertisement, such as a register ID for identifying an advertisement used in the radio-tag system 1, an advertisement type indicating a type of an advertisement corresponding to a type of an item to be attached with a radio tag, advertisement information, advertiser information indicating a name of an advertiser and its contact information, a contract condition indicating a calculation condition for a price for advertisement to be paid by an advertiser, and an issued advertisement ID which is an advertisement ID issued to the radio-tag management device 200.

The advertisement-ID management table 112 is a table that stores information for advertisement IDs issued to the radio-tag management device 200. FIG. 4 depicts an example of the contents of the advertisement-ID management table 112. The advertisement-ID management table 112 stores therein data associated with one another, for each advertisement ID issued, such as an advertisement ID, a register ID of a target advertisement, an address of a radio-tag management device to which the advertisement ID is issued, and the number of accesses being the number of access times each in which the advertisement information is accessed by using the advertisement ID.

The advertisement-information register unit 120 is a processor that accepts information on an advertisement from an advertiser and stores it in the advertisement-information storage unit 110. More specifically, the advertisement-information register unit 120 registers information such as advertisement types, the advertisement information, the advertiser information, and the contract condition in the advertisement-content table 111.

The advertisement-ID issuing unit 130 is a processor that accepts an advertisement-ID-issue request from the radio-tag management device 200 and issues an advertisement ID. More specifically, the advertisement-ID issuing unit 130 searches the advertisement-content table 111 to identify an advertisement of which advertisement type matches an item type specified by the radio-tag management device 200, creates an advertisement ID for the advertisement identified, and issues the advertisement ID.

Furthermore, the advertisement-ID issuing unit 130 registers the advertisement ID issued in the advertisement-content table 111 as an issued advertisement ID, creates a new entry in the advertisement-ID management table 112, and registers the advertisement ID issued, the register ID, and the address of the radio-tag management device.

The advertisement-use management unit 140 is a processor that transmits advertisement information in response to an advertisement-information transmission request from the user's terminal 300. More specifically, the advertisement-use management unit 140 searches the advertisement-ID management table 112 to obtain a register ID corresponding to an advertisement ID specified by the user's terminal 300, searches the advertisement-content table 111 using the register ID obtained to obtain advertisement information, and transmits the advertisement information to the user's terminal 300. Furthermore, the advertisement-use management unit 140 increments the number of accesses related to the advertisement ID in the advertisement-ID management table 112 by "1", the advertisement ID being specified through the user's terminal 300.

The advertisement totaling unit 150 is a processor that calculates a price for advertisement which an advertiser pays to a purchaser of the radio tag based on the number of accesses in the advertisement-ID management table 112 and the contract condition in the advertisement-content table 111 when the use of the advertisement ID is complete, and that informs the price to the advertiser and the radio-tag management device 200. Furthermore, the advertisement totaling unit 150 receives the result of comparison between the price of advertisement calculated by its own and the price of advertisement calculated by the radio-tag management device 200, from the radio-tag management device 200, and transmits the result to the advertiser.

The radio-tag management device 200 is a device that manages information on radio tags, and includes a tag-information storage unit 210, a tag-information register unit 220, an advertisement-ID-issue requesting unit 230, an advertisement-ID writing unit 240, a tag-information informing unit 250, and an advertisement-revenue calculating unit 260.

The tag-information storage unit 210 is a storage unit that stores information for managing radio tags, and includes a tag information table 211 and an advertisement management table 212.

The tag information table 211 is a table that stores information on radio tags. FIG. 5 depicts an example of the contents of the tag information table 211. The tag information table 211 stores data associated with one another, for each radio tag, such as a tag ID, a purchaser information indicating a name of a purchaser of a radio tag and its contact information, tag information containing traceability information, and an advertisement ID for connecting a radio tag to an advertisement related to an item to be attached with the radio tag.

The advertisement management table 212 is a table that stores information on advertisements each related to an item to be attached with a radio tag. FIG. 6 depicts an example of the contents of the advertisement management table 212. The advertisement management table 212 stores therein, for each advertisement ID issued by the advertisement management device 100, an item type indicating a type of an item to be attached with a radio tag, an address of an advertisement management device indicating the address of the advertisement management device 100 which issues the advertisement ID, an advertisement ID, the number of accesses indicating the number of times at which a consumer views traceability information stored in the radio tag, a contract condition, and the charges due to advertisements collected. It is assumed that an item type and an address of an advertisement management device which manages an advertisement related to the item type are previously registered in the advertisement management table 212.

The tag-information register unit 220 is a processor that registers information stored in the tag-information storage unit 210. More specifically, the tag-information register unit 220 registers the purchaser information and the tag information in the tag information table 211, and registers the item type and the address of the advertisement management device in the advertisement management table 212.

The advertisement-ID-issue requesting unit 230 is a processor that specifies a type of an item to be attached with a radio tag to request issue of an advertisement ID to the advertisement management device 100. The processor receives the advertisement ID issued and the contract condition for a corresponding advertisement from the advertisement management device 100, stores the advertisement ID associated with the tag ID in the tag information table 211, and stores the advertisement ID and the contract condition, which are associated with the item type, in the advertisement management table 212.

The advertisement-ID-issue requesting unit 230 requests the advertisement ID to the advertisement management device 100, stores the advertisement ID issued associated with the tag ID in the tag information table 211, and stores the advertisement ID and the contract condition, which are associated with the item type, in the advertisement management table 212, and this allows the radio-tag management device 200 to manage information on the advertisement associated with the radio tag. The advertisement-ID-issue requesting unit 230 identifies an address of the advertisement management device 100 to which the advertisement ID is requested, using the advertisement management table 212.

The advertisement-ID writing unit 240 is a processor that searches the advertisement management table 212 to find an advertisement ID corresponding to an item to be attached with a radio tag, and writes the advertisement ID to the radio tag when space becomes available in the storage area of the radio tag.

The advertisement-ID writing unit 240 searches the advertisement management table 212 to find an advertisement ID corresponding to an item to be attached with a radio tag and writes the advertisement ID to the radio tag, and the user's terminal 300 can thereby read the advertisement ID from the radio tag and request the corresponding advertisement information to the advertisement management device 100.

The tag-information informing unit 250 is a processor that transmits traceability information in response to the request from the user's terminal 300. More specifically, the tag-information informing unit 250 receives the tag ID from the user's terminal 300, searches the tag information table 211 using the tag ID to fetch tag information, extracts traceability information from the tag information, and transmits the traceability information to the user's terminal 300.

Furthermore, the tag-information informing unit 250 searches the tag information table 211 using the tag ID to obtain a corresponding advertisement ID, searches the advertisement management table 212 using the advertisement ID obtained to obtain an address of the advertisement management device, and transmits the address to the user's terminal 300, and at the same time, increments the number of accesses in the advertisement management table 212 by "1".

The advertisement-revenue calculating unit 260 is a processor that calculates a price for advertisement which an advertiser pays to a radio-tag purchaser based on the number of accesses and the contract condition in the advertisement management table 212 upon completion of the use of the advertisement ID, and that stores the price as charges to be collected, in the advertisement management table 212. The advertisement-revenue calculating unit 260 receives the price for advertisement calculated by the advertisement management device 100, compares the price with the price calculated by its own, and transmits the result of comparison to the radio-tag purchaser and the advertisement management device 100.

The user's terminal 300 is a device used when a consumer who purchases an item attached with the radio tag views its traceability information, and includes a tag reader and a tag-information display unit 310.

The tag-information display unit 310 is a processor that acquires traceability information and an address of an advertisement management device from the radio-tag management device 200 using the tag ID read from the radio tag by the tag reader, acquires advertisement information from the advertisement management device 100 of the address of the advertisement management device acquired, and displays the traceability information together with the advertisement.

FIG. 7 depicts an example of display of the traceability information and the advertisement on the tag-information display unit 310. Assuming an item is cabbage, the tag-information display unit 310 displays a recipe for a cabbage dish and copy of advertisement for source for Hoi-Ko-Ro of A Foods as an advertisement, in addition to the traceability information.

Figure 8:
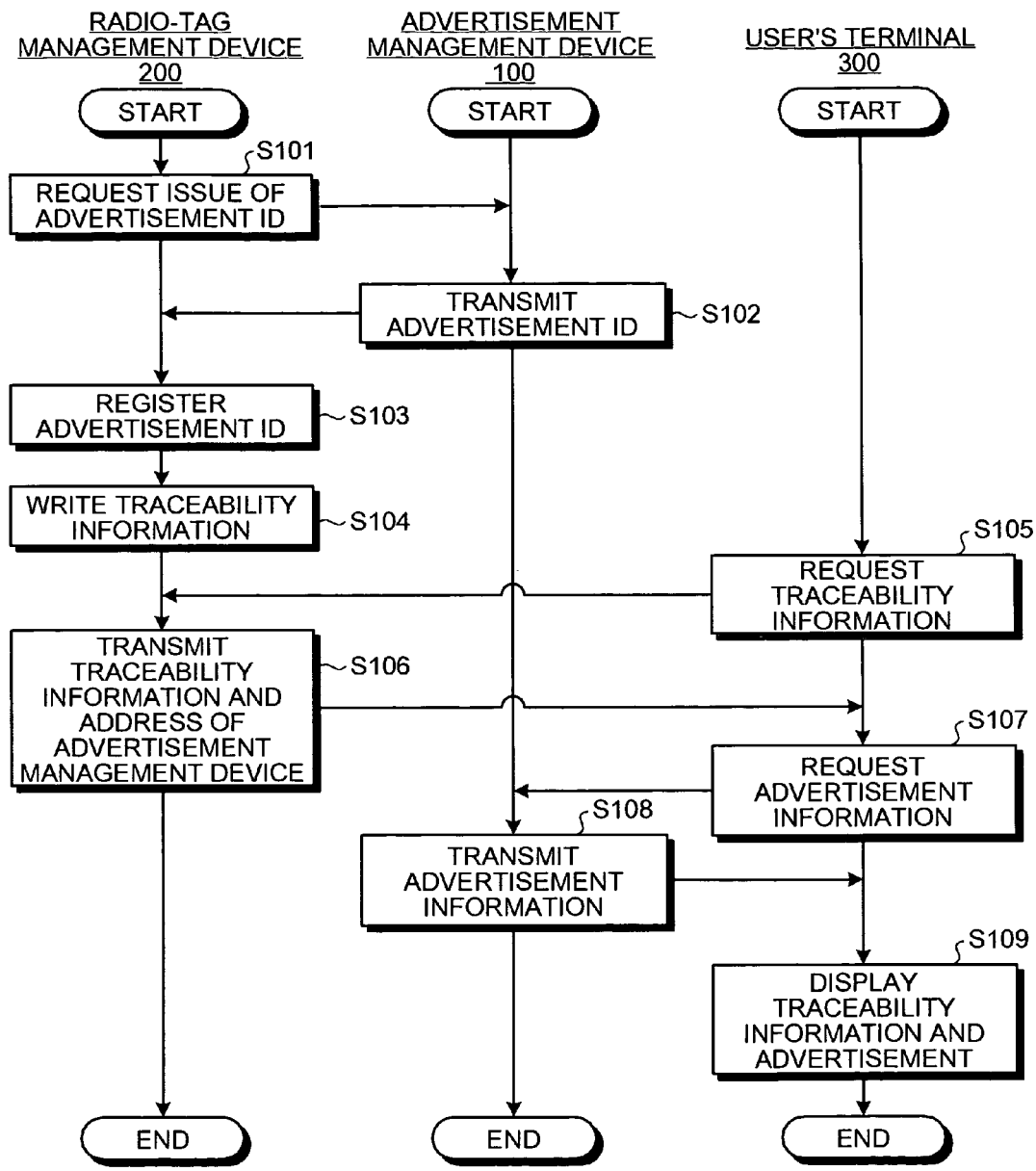
FIG. 8 is a flowchart of the processes performed by the radio-tag system shown in FIG. 2 when displaying traceability information.

The overview of processes up to display of the traceability information by the radio-tag system 1 according to the embodiment is explained below. FIG. 8 is a flowchart of the overview of processes up to display of the traceability information by the radio-tag system 1.

As shown in FIG. 8, in the radio-tag system 1, when the advertisement-ID-issue requesting unit 230 of the radio-tag management device 200 requests issue of an advertisement ID to the advertisement management device 100 (step S101), the advertisement-ID issuing unit 130 of the advertisement management device 100 creates an advertisement ID, and transmits the advertisement ID created to the radio-tag management device 200 (step S102).

Then, the advertisement-ID-issue requesting unit 230 registers the advertisement ID or so received, in the tag information table 211 and the advertisement management table 212 (step S103). Then, when space becomes available in the storage area of the radio tag, the advertisement-ID writing unit 240 writes the advertisement ID corresponding to the radio tag to the radio tag (step S104). In parallel with the processes at step S101 to step S104, the traceability information is stored in the radio-tag management device 200.

Thereafter, when the consumer purchases an item attached with the radio tag and operates the user's terminal 300 for viewing its traceability information, the tag-information display unit 310 of the user's terminal 300 requests the traceability information to the radio-tag management device 200 (step S105). After the step, the tag-information informing unit 250 of the radio-tag management device 200 transmits the traceability information and the address of the advertisement management device (step S106), and the tag-information display unit 310 requests the advertisement information to the advertisement management device 100 using the address of the advertisement management device (step S107).

Then, the advertisement-use management unit 140 of the advertisement management device 100 transmits the advertisement information to the user's terminal 300 (step S108), and the tag-information display unit 310 receives the advertisement information and displays the advertisement together with the traceability information (step S109).

By displaying the advertisement using the advertisement ID in the above manner, the advertisement management device 100 does not need to store the tag ID. This allows elimination of the risk of leakage of traceability information, which is the personal information, from the advertisement management device 100 caused by the access of the advertisement management device 100 to the traceability information.

Figure 9:
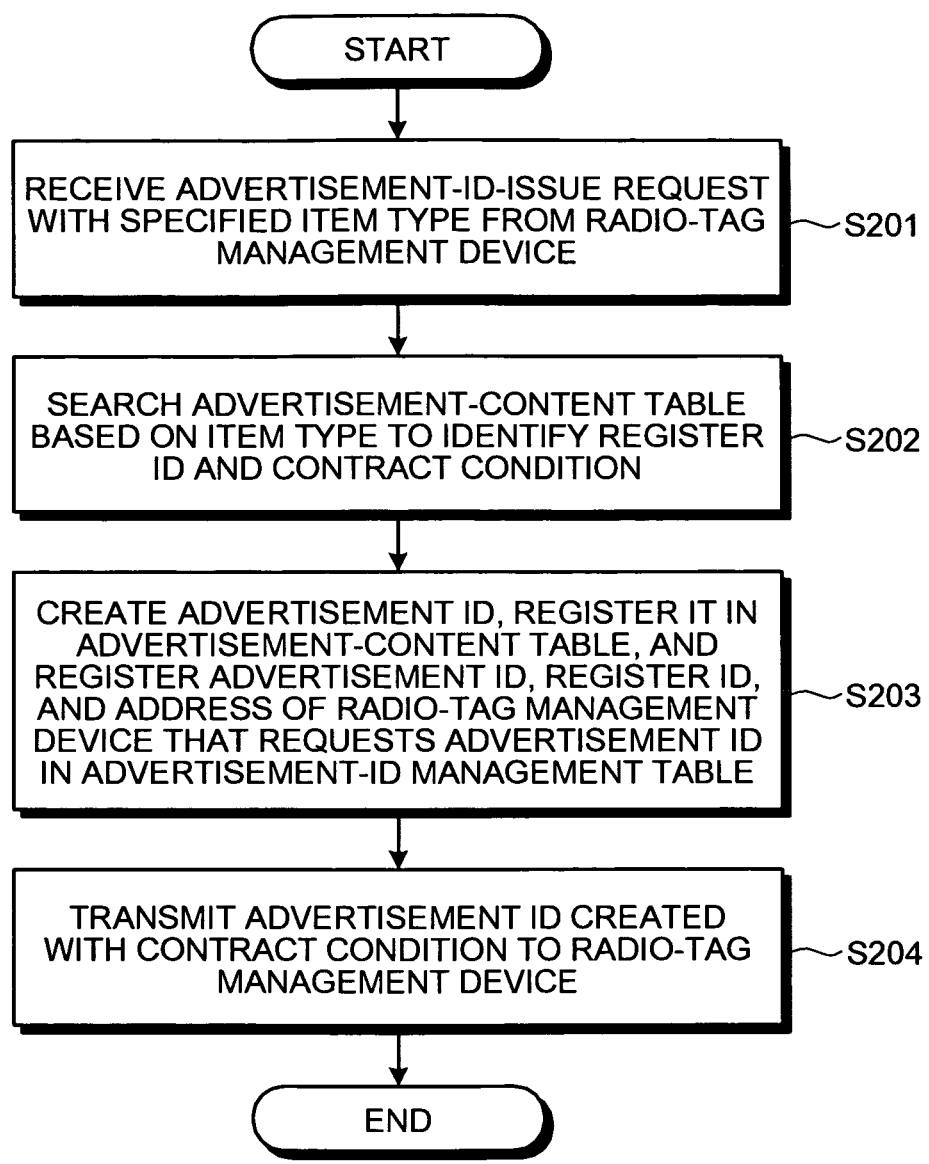
FIG. 9 is a flowchart of an advertisement-ID issuing process performed by an advertisement-ID issuing unit shown in FIG. 2.

Procedures for the advertisement management device 100, the radio-tag management device 200, and the user's terminal 300 are explained below with reference to FIG. 9 to FIG. 14. FIG. 9 is a flowchart of an advertisement-ID issuing process performed by the advertisement-ID issuing unit 130.

As shown in FIG. 9, in the advertisement-ID issuing process, the advertisement-ID issuing unit 130 receives an advertisement-ID-issue request with a specified item type from the radio-tag management device 200 (step S201), and searches the advertisement-content table 111 based on the item type to identify the register ID and contract condition corresponding to the item (step S202).

The advertisement-ID issuing unit 130 creates an advertisement ID and registers it as an issued advertisement ID in the advertisement-content table 111, and registers the advertisement ID created, the register ID, and the address of the radio-tag management device 200 that requests the advertisement ID, as a new entry, in the advertisement-ID management table 112 (step S203). And the advertisement-ID issuing unit 130 transmits the advertisement ID created together with the contract condition to the radio-tag management device 200 (step S204).

In this manner, the advertisement-ID issuing unit 130 creates the advertisement ID corresponding to the item type specified by the radio-tag management device 200, registers the advertisement ID created in the advertisement-content table 111 and the advertisement-ID management table 112, and transmits the advertisement ID to the radio-tag management device 200, to thereby enable management of the advertisement using the advertisement ID.

Figure 10:
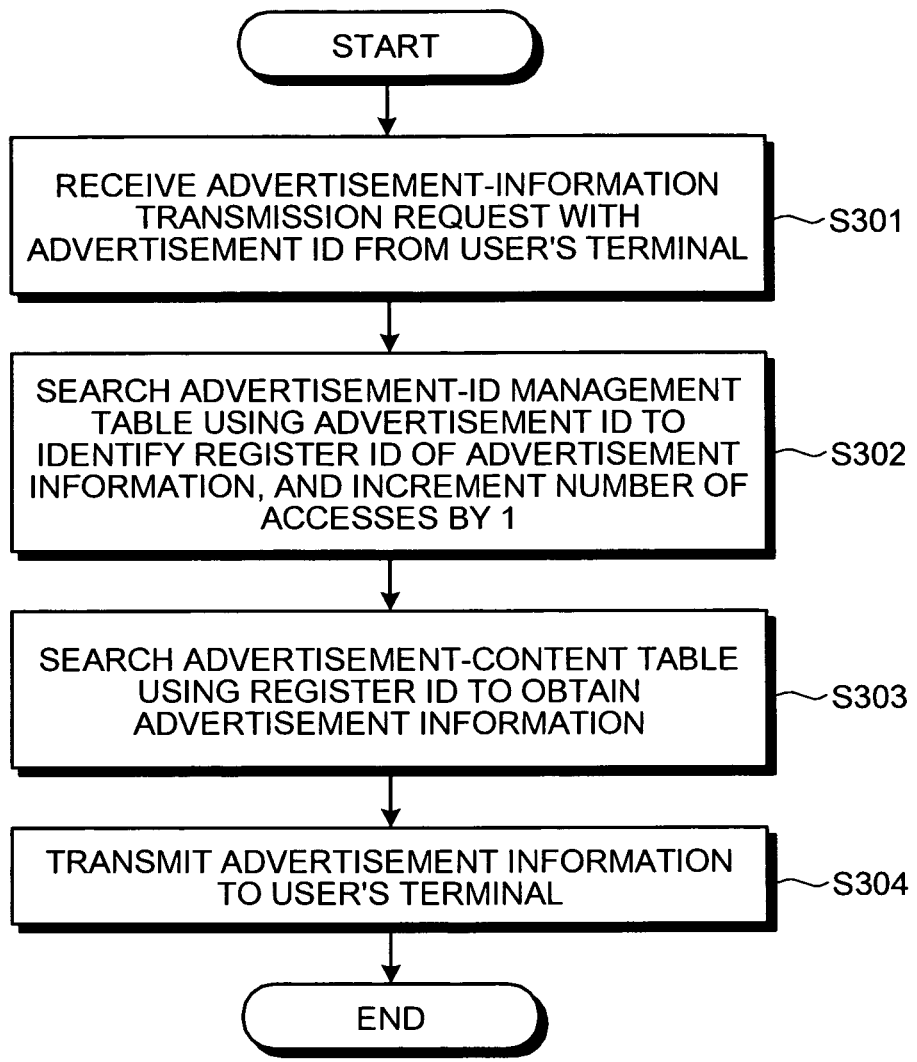
FIG. 10 is a flowchart of an advertisement-information providing process performed by an advertisement-use management unit shown in FIG. 2.

FIG. 10 is a flowchart of an advertisement-information providing process performed by the advertisement-use management unit 140. In the advertisement-information providing process, the advertisement-use management unit 140 receives an advertisement-information transmission request together with the advertisement ID from the user's terminal 300 (step S301).

Then, the advertisement-use management unit 140 searches the advertisement-ID management table 112 using the advertisement ID to identify the register ID of the advertisement information (step S302), and increments the number of accesses in the advertisement-ID management table 112 by "1".

Further, the advertisement-use management unit 140 searches the advertisement-content table 111 using the register ID identified to obtain the advertisement information (step S303), and transmits the advertisement information obtained to the user's terminal 300 (step S304).

In this manner, the advertisement-use management unit 140 receives the advertisement ID from the user's terminal 300 and transmits the corresponding advertisement information to the user's terminal 300, and the user's terminal 300 can thereby display the advertisement together with the traceability information.

Figure 11:
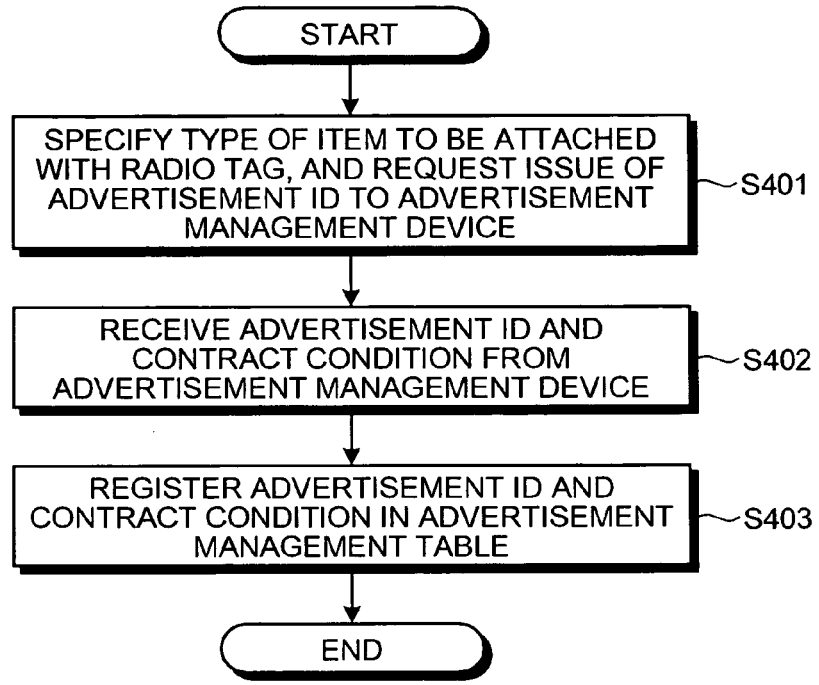
FIG. 11 is a flowchart of an advertisement-ID-issue requesting process performed by an advertisement-ID-issue requesting unit shown in FIG. 2.

FIG. 11 is a flowchart of an advertisement-ID-issue requesting process performed by the advertisement-ID-issue requesting unit 230. In the advertisement-ID-issue requesting process, the advertisement-ID-issue requesting unit 230 specifies the type of an item to be attached with a radio tag and requests issue of an advertisement ID to the advertisement management device 100 (step S401).

The advertisement-ID-issue requesting unit 230 receives the advertisement ID and its contract condition from the advertisement management device 100 (step S402), and registers the advertisement ID and its contract condition corresponding to the item type in the advertisement management table 212 (step S403).

In this manner, the advertisement-ID-issue requesting unit 230 requests issue of the advertisement ID to the advertisement management device 100 and registers the advertisement ID issued in a predetermined location of the advertisement management table 212, and the radio-tag management device 200 can thereby manage the item type associated with the advertisement ID.

Figure 12:
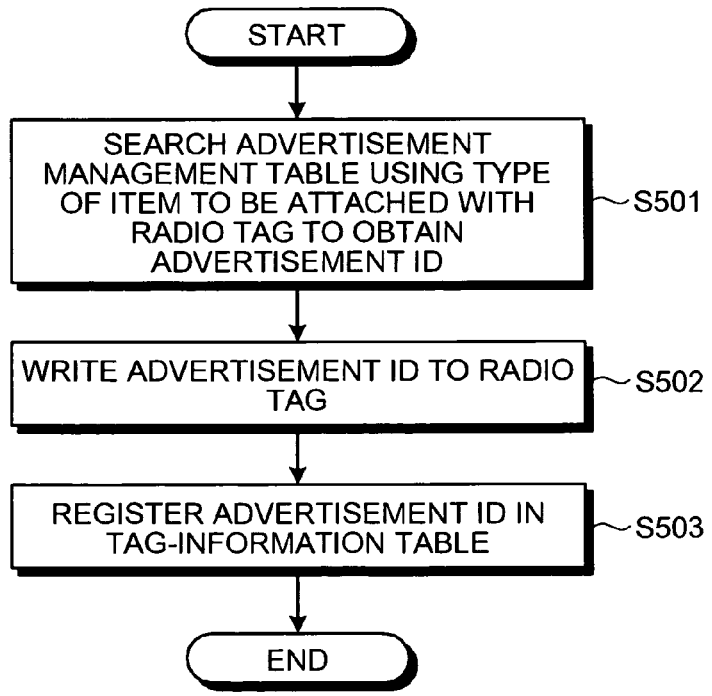
FIG. 12 is a flowchart of an advertisement-ID writing process performed by the advertisement-ID writing unit shown in FIG. 2.

FIG. 12 is a flowchart of an advertisement-ID writing process performed by the advertisement-ID writing unit 240. The advertisement-ID writing process is started when space becomes available in the storage area of the radio tag.

As shown in FIG. 12, in the advertisement-ID writing process, the advertisement-ID writing unit 240 searches the advertisement management table 212 using the type of an item to be attached with a radio tag to obtain an advertisement ID (step S501).

Then, the advertisement-ID writing unit 240 writes the advertisement ID obtained to the radio tag (step S502), and registers the advertisement ID associated with the radio tag, to which the advertisement ID has been written, in the tag information table 211 (step S503).

In this manner, the advertisement-ID writing unit 240 writes the advertisement ID to the radio tag and registers the advertisement ID in a corresponding location of the tag information table 211, and the radio-tag management device 200 can thereby manage the radio tag associated with the advertisement ID.

Figure 13:
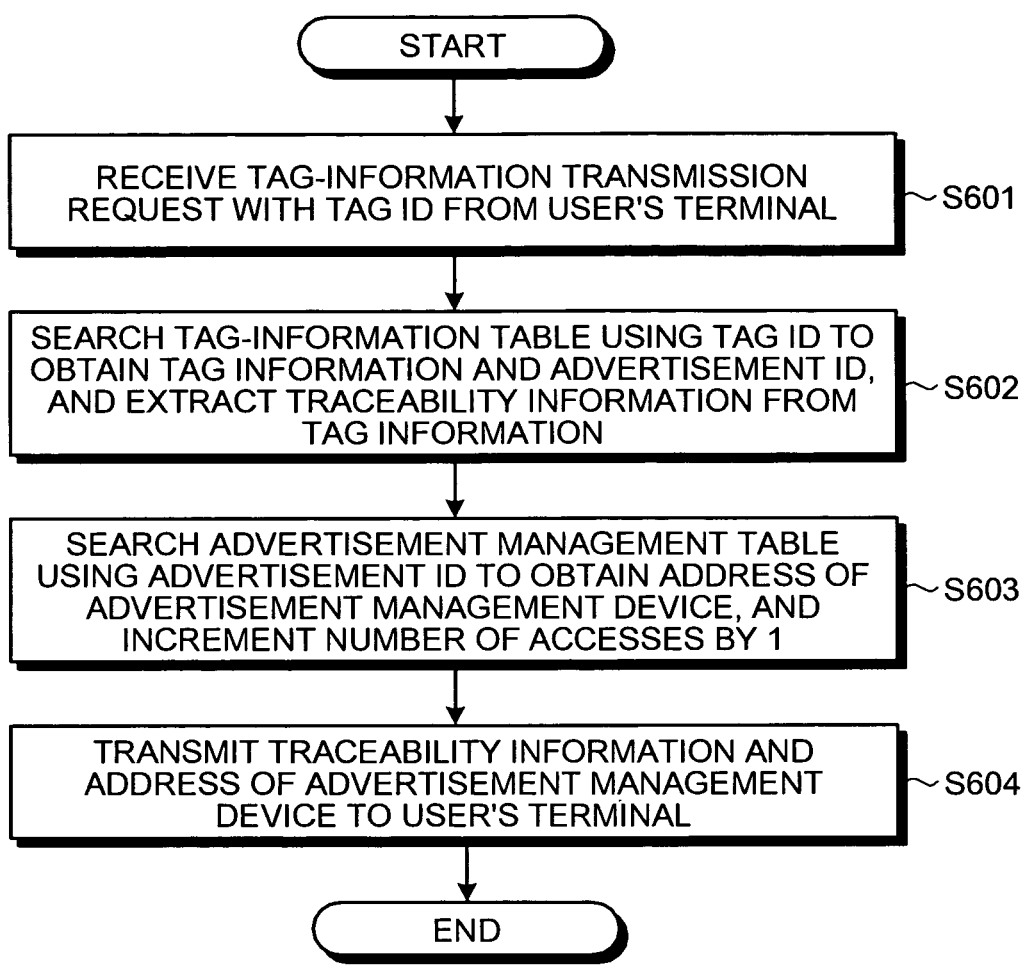
FIG. 13 is a flowchart of a tag-information informing process performed by a tag-information informing unit shown in FIG. 2.

FIG. 13 is a flowchart of a tag-information informing process performed by the tag-information informing unit 250. In the tag-information informing process, the tag-information informing unit 250 receives a tag ID and a tag-information transmission request from the user's terminal 300 (step S601).

Then, the tag-information informing unit 250 searches the tag information table 211 using the tag ID to obtain tag information and an advertisement ID, and extracts traceability information from the tag information obtained (step S602). Furthermore, the tag-information informing unit 250 searches the advertisement management table 212 using the advertisement ID obtained to obtain an address of an advertisement management device and increments the number of accesses by "1" (step S603). Then, the tag-information informing unit 250 transmits the traceability information and the address of the advertisement management device to the user's terminal 300 (step S604).

In this manner, the tag-information informing unit 250 transmits the traceability information and the address of the advertisement management device corresponding to the tag ID, to the user's terminal 300, and the user's terminal 300 can identify the advertisement management device 100 to which transmission of the advertisement information is requested, based on the advertisement ID read from the radio tag.

Figure 14:
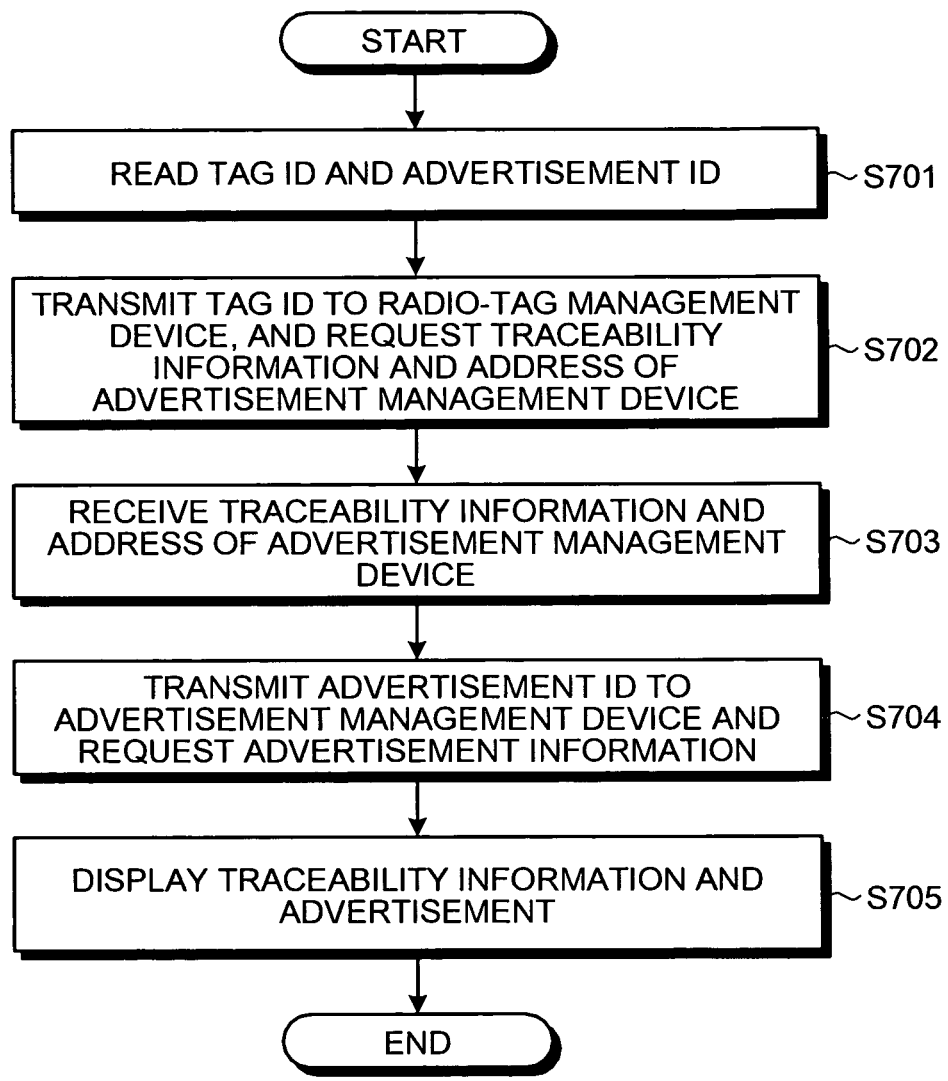
FIG. 14 is a flowchart of a tag-information displaying process performed by a tag-information display unit shown in FIG. 2.

FIG. 14 is a flowchart of a tag-information displaying process performed by the tag-information display unit 310. In the tag-information displaying process, the tag-information display unit 310 reads the tag ID and the advertisement ID (step S701).

Then, the tag-information display unit 310 transmits the tag ID to the radio-tag management device 200, and requests the traceability information and the address of the advertisement management device (step S702). When receiving the traceability information and the address of the advertisement management device (step S703), the tag-information display unit 310 transmits the advertisement ID to the advertisement management device 100 of the address received, and requests the advertisement information (step S704). When receiving the advertisement information, the tag-information display unit 310 displays the advertisement together with the traceability information (step S705).

In this manner, the tag-information display unit 310 acquires the traceability information from the radio-tag management device 200 and acquires the advertisement information from the advertisement management device 100, which allows the advertisement in addition to the traceability information to be displayed on the user's terminal 300.

As explained above, in the embodiment, the advertisement-ID-issue requesting unit 230 of the radio-tag management device 200 requests issue of the advertisement ID to the advertisement management device 100, the advertisement-ID issuing unit 130 of the advertisement management device 100 issues the advertisement ID. When space becomes available in the storage area of the radio tag, the advertisement-ID writing unit 240 writes the advertisement ID to the radio tag. When the consumer who purchases an item attached with the radio tag operates the user's terminal 300 to view the traceability information for the item, the tag-information display unit 310 of the user's terminal 300 reads a tag ID and an advertisement ID from the radio tag, specifies the tag ID to acquire the traceability information from the radio-tag management device 200, specifies the advertisement ID to acquire the advertisement information from the advertisement management device 100, and displays the advertisement in addition to the traceability information. This allows the advertisement management device 100 to manage advertisements without using each tag ID.

Therefore, the advertisement management device 100 cannot acquire the traceability information from the radio-tag management device 200 using the tag ID. As a result, it is possible to eliminate the risk of traceability information leaking from the advertisement management device 100.

In the embodiment, the case where a plurality of advertisement management devices 100 are provided is explained, but the advertisement management device 100 may be provided as a single unit. When there is one advertisement management device 100, the user's terminal 300 can access the advertisement management device 100 of a fixed address without acquiring the address of an advertisement management device from the radio-tag management device 200, and acquire advertisement information.

In the embodiment, the case where the radio-tag management device 200 is provided as a single unit is explained, but a plurality of radio-tag management devices 200 can be provided. However, when the plurality of the radio-tag management devices 200 are to be provided, a device is required. The device manages a correlation between tag IDs and the radio-tag management devices 200 so that the user's terminal 300 can query the correlation using the tag ID to identify a radio-tag management device 200 which should be accessed.

In the embodiment, the case where the purchaser of a radio tag uses the radio tag is explained, but the present invention is also applicable to a case, in addition to the above case, in which the purchaser of the radio tag permits another radio-tag user to use a part of a storage area in the radio tag or to use it in a fixed period, and in which the radio-tag user permitted to use the radio tag is to obtain advertisement revenue.

In the embodiment, the case where the advertisement ID is written to the radio tag and the user's terminal 300 reads the advertisement ID from the radio tag for use is explained. However, only a tag ID is written to the radio tag, and the user's terminal 300 can query the radio-tag management device 200 using the tag ID read from the radio tag to identify the advertisement ID.

In the embodiment, the advertisement management device, the radio-tag management device, and the user's terminal are explained, but the configurations of these devices are implemented by software to obtain an advertisement management program, a radio-tag management program, and a user program, respectively, each of which has the same function as above. As one of examples, a computer that executes the radio-tag management program is explained below.

Figure 15:
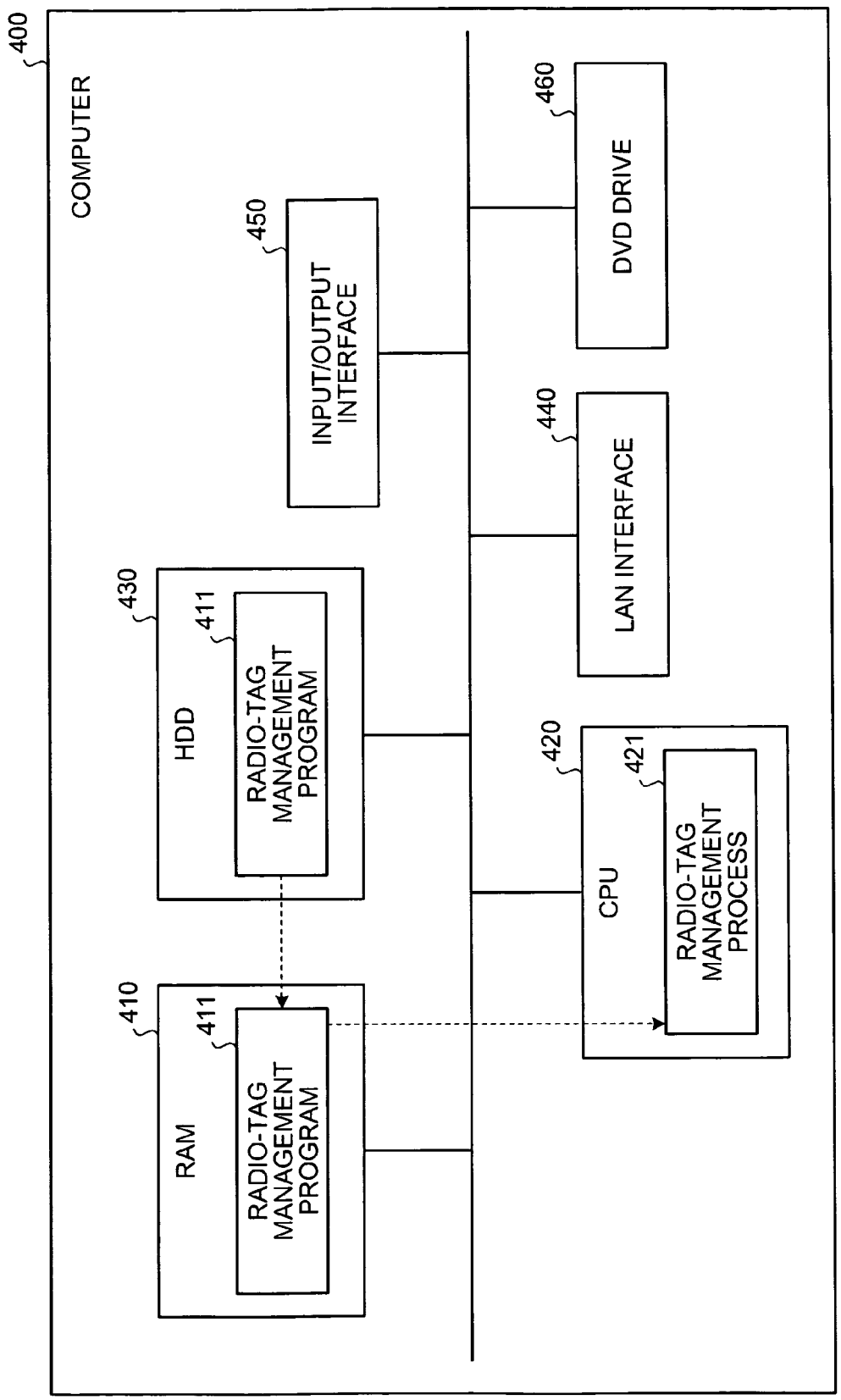
FIG. 15 is a functional block diagram of a computer that realizes the units, steps, process, methods according to the embodiment.

FIG. 15 is a functional block diagram of a computer 400 that executes the radio-tag management program according to the embodiment. The computer 400 includes a random access memory (RAM) 410, a central processing unit (CPU) 420, a hard disk drive (HDD) 430, a local area network (LAN) interface 440, an input/output interface 450, and a digital versatile disk (DVD) drive 460.

The RAM 410 is a memory that stores a program and a result in the middle of execution of the program or the like, and the CPU 420 is the central processing unit that reads the program from the RAM 410 and executes it.

The HDD 430 is a disk device that stores programs and data, and the LAN interface 440 is an interface for connecting the computer 400 to another computer through LAN.

The input/output interface 450 is an interface for connecting an input device such as a mouse and a keyboard and a display unit to the computer 400, and the DVD drive 460 is a device that performs read/write on DVD.

A radio-tag management program 411 executed in the computer 400 is stored in DVD, is read from the DVD by the DVD drive 460, and is installed in the computer 400.

Alternatively, the radio-tag management program 411 is stored in a database of another computer system connected through the LAN interface 440, is read from the database, and installed in the computer 400.

The radio-tag management program 411 installed is stored in the HDD 430, is read to the RAM 410, and is executed as a radio-tag management process 421 by the CPU 420.

According to an aspect of the present invention, an advertisement management device manages advertisement and advertisement IDs, a radio-tag management device manages tag IDs and traceability information, and a user terminal manages sends an advertisement ID to the advertisement management device to fetch an advertisement and sends tag ID to the radio-tag management device to fetch traceability information from the radio-tag management device. Therefore, even if a person has access to the advertisement management device he cannot acquire tag IDs from the radio-tag management device so that he cannot acquire traceability information.

According to another aspect, advertisement revenue is accurately calculated, and this allows a tag purchaser to charge an advertiser for an appropriate advertisement price.

According to still another aspect, an appropriate advertisement is displayed together with the tag information, and this allows a highly effective advertisement to be displayed.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A computer-readable recording medium that stores a computer program for managing information on a plurality of radio tags, the computer program causing the computer to execute a process comprising:
   requesting issue of an advertisement identifier for identifying an advertisement, to an advertisement management device which manages the advertisement to be displayed in addition to tag information including traceability information stored in a radio tag when a user's terminal displays the tag information including the traceability information, the user's terminal being used by a purchaser of an item attached with the radio tag;
   receiving the advertisement identifier requested at the requesting from the advertisement management device;
   storing the advertisement identifier associated with a tag identifier of the radio tag in a storage device of the computer;
   writing the advertisement identifier stored in the storage device at the storing, to the radio tag to which the corresponding tag identifier has been written so that the advertisement identifier can be read from the radio tag and specified when the user's terminal requests the advertisement to the advertisement management device;
   receiving the tag identifier from the user's terminal, stored in the radio tag; and
   transmitting, to the user's terminal, the traceability information and an address of the advertisement management device in the storage device, associated with the tag identifier received from the user's terminal, when receiving the tag identifier from the user's terminal, stored in the radio tag, the address being transmitted so that the user's terminal requests the advertisement to the advertisement management device using the address of the advertise management device, the advertisement management device transmits the advertisement associated with the advertisement identifier to the user's terminal, and the user's terminal receives the advertisement from the advertisement management device and displays the advertisement with the traceability information.

2. The computer-readable recording medium according to claim 1, wherein the receiving the advertisement identifier includes
   receiving the advertisement identifier and a contract condition from the advertisement management device, the contract condition being related to the price for advertisement calculated based on the number of times of displaying the advertisement to a purchaser, storing them in the storage device, and transmitting the tag information and incrementing the number of accesses to the corresponding advertisement identifier when the tag information is requested from the user's terminal; and
   calculating advertisement revenue based on the contract condition assuming the number of accesses as the number of times of display.

3. The computer-readable recording medium according to claim 1, wherein the requesting includes specifying an item type and requesting issue of an advertisement identifier for an advertisement related to the item type.

4. The computer-readable recording medium according to claim 1, wherein the writing is executed when space becomes available in a storage area of the radio tag.

5. A radio-tag management method for managing information on a plurality of radio tags, comprising:
   requesting, using a computer, issue of an advertisement identifier for identifying an advertisement, to an advertisement management device which manages the advertisement to be displayed in addition to tag information including traceability information stored in a radio tag when a user's terminal displays the tag information including the traceability information, the user's terminal being used by a purchaser of an item attached with the radio tag;

receiving, using the computer, the advertisement identifier requested at the requesting from the advertisement management device;

storing, using the computer, the advertisement identifier associated with a tag identifier of the radio tag in a storage device of the computer;

writing, using the computer, the advertisement identifier stored in the storage device at the storing, to the radio tag to which the corresponding tag identifier has been written so that the advertisement identifier can be read from the radio tag and specified when the user's terminal requests the advertisement to the advertisement management device;

receiving the tag identifier from the user's terminal, stored in the radio tag; and transmitting, to the user's terminal, the traceability information and an address of the advertisement management device in the storage device, associated with the tag identifier received from the user's terminal, when receiving the tag identifier from the user's terminal, stored in the radio tag, the address being transmitted so that the user's terminal requests the advertisement to the advertise management device using the address of the advertisement management device, the advertisement management device transmits the advertisement associated with the advertisement identifier to the user's terminal, and the user's terminal receives the advertisement from the advertisement management device and displays the advertisement with the traceability information.

6. The radio-tag management method according to claim 5, wherein the receiving the advertisement identifier includes
receiving the advertisement identifier and a contract condition from the advertisement management device, the contract condition being related to the price for advertisement calculated based on the number of times of displaying the advertisement to a purchaser, storing them in the storage device, and transmitting the tag information and incrementing the number of accesses to the corresponding advertisement identifier when the tag information is requested from the user's terminal; and
calculating advertisement revenue based on the contract condition assuming the number of accesses as the number of times of display.

7. The radio-tag management method according to claim 5, wherein the requesting includes specifying an item type and requesting issue of an advertisement identifier for an advertisement related to the item type.

8. The radio-tag management method according to claim 5, wherein the writing is executed when space becomes available in a storage area of the radio tag.

9. A radio-tag management device that manages information on a plurality of radio tags, comprising:
an advertisement-identifier-issue requesting unit that requests issue of an advertisement identifier for identifying an advertisement, to an advertisement management device which manages the advertisement to be displayed in addition to tag information including traceability information stored in a radio tag when a user's terminal displays the tag information including the traceability information, the user's terminal being used by a purchaser of an item attached with the radio tag;
an advertisement-identifier storing unit that receives the advertisement identifier requested by the advertisement-identifier-issue requesting unit from the advertisement management device, and stores the advertisement identifier associated with a tag identifier of the radio tag in a storage device of the radio-tag management device;
an advertisement-identifier writing unit that writes the advertisement identifier stored in the storage device by the advertisement-identifier storing unit, to the radio tag to which the corresponding tag identifier has been written so that the advertisement identifier can be read from the radio tag and specified when the user's terminal requests the advertisement to the advertisement management device; and
a transmitting unit that receives the tag identifier from the user's terminal, stored in the radio tag, and transmits, to the user's terminal, the traceability information and an address of the advertisement management device in the storage device, associated with the tag identifier received from the user's terminal, stored in the radio tag, the address being transmitted so that the user's terminal requests the advertisement to the advertisement management device using the address of the advertise management device, the advertisement management device transmits the advertisement associated with the advertisement identifier to the user's terminal, and the user's terminal receives the advertisement from the advertisement management device and displays the advertisement with the traceability information.

10. The radio-tag management device according to claim 9, wherein the advertisement-identifier storing unit
receives the advertisement identifier and a contract condition from the advertisement management device, the contract condition being related to the price for advertisement calculated based on the number of times of displaying the advertisement to a purchaser, stores them in the storage device, and transmits the tag information and increments the number of accesses to the corresponding advertisement identifier when the tag information is requested from the user's terminal; and
calculates advertisement revenue based on the contract condition assuming the number of accesses as the number of times of display.

11. The radio-tag management device according to claim 9, wherein the advertisement-identifier storing unit specifies an item type and requesting issue of an advertisement identifier for an advertisement related to the item type.

12. The radio-tag management device according to claim 9, wherein the advertisement-identifier writing unit writes the advertisement identifier to the radio tag when space becomes available in a storage area of the radio tag.

13. A computer-readable recording medium that stores a computer program for managing advertisement, the computer program causing the computer to execute a process comprising:
issuing an advertisement identifier for identifying an advertisement in response to a request from a radio-tag management device which manages information on a plurality of radio tags, the advertisement being displayed in addition to tag information including traceability information stored in a radio tag when a user's terminal displays the tag information including the traceability information, the user's terminal being used by a purchaser of an item attached with the radio tag, the radio-tag management device receiving the advertisement identifier, storing the advertisement identifier associated with a tag identifier of the radio tag in a storage device of the radio-tag management device, receiving the tag identifier from the user's terminal, stored in the radio tag, and transmitting, to the user's terminal, the traceability information and an address of the advertisement management device in the storage device, associated with the tag identifier received from the user's terminal, stored in the radio tag; and transmitting an advertisement in response to a transmission request of the advertisement corresponding to the advertisement identifier sent from the user's terminal which reads the advertisement identifier from the radio tag when the tag information including the traceability information for the radio tag is displayed, the radio tag to which the advertisement identifier issued at the issuing being written by the radio-tag management device.

14. The computer-readable recording medium according to claim 13, wherein the issuing includes issuing an advertisement identifier that identifies an advertisement related to an item type specified by the radio-tag management device.

15. A method of managing advertisement, the method comprising:

issuing an advertisement identifier for identifying an advertisement in response to a request from a radio-tag management device which manages information on a plurality of radio tags, the advertisement being displayed in addition to tag information including traceability information stored in a radio tag when a user's terminal displays the tag information including the traceability information, the user's terminal being used by a purchaser of an item attached with the radio tag, the radio-tag management device receiving the advertisement identifier, storing the advertisement identifier associated with a tag identifier of the radio tag in a storage device of the radio-tag management device, receiving the tag identifier from the user's terminal, stored in the radio tag, and transmitting, to the user's terminal, the traceability information and an address of the advertisement management device in the storage device, associated with the tag identifier received from the user's terminal, stored in the radio tag; and transmitting an advertisement in response to a transmission request of the advertisement corresponding to the advertisement identifier sent from the user's terminal which reads the advertisement identifier from the radio tag when the tag information including the traceability information for the radio tag is displayed, the radio tag to which the advertisement identifier issued at the issuing being written by the radio-tag management device.

16. A device for managing advertisement, comprising:

an issuing unit that issues an advertisement identifier for identifying an advertisement in response to a request from a radio-tag management device which manages information on a plurality of radio tags, the advertisement being displayed in addition to tag information including traceability information stored in a radio tag when a user's terminal displays the tag information including the traceability information, the user's terminal being used by a purchaser of an item attached with the radio tag, the radio-tag management device receiving the advertisement identifier, storing the advertisement identifier associated with a tag identifier of the radio tag in a storage device of the radio-tag management device, receiving the tag identifier from the user's terminal, stored in the radio tag, and transmitting, to the user's terminal, the traceability information and an address of the advertisement management device in the storage device, associated with the tag identifier received from the user's terminal, stored in the radio tag; and a transmitting unit that transmits an advertisement in response to a transmission request of the advertisement corresponding to the advertisement identifier sent from the user's terminal which reads the advertisement identifier from the radio tag when the tag information including the traceability information for the radio tag is displayed, the radio tag to which the advertisement identifier issued by the issuing unit being written by the radio-tag management device.

17. A computer-readable recording medium that stores a computer program that causes the computer to execute a process comprising:

reading a tag identifier and an advertisement identifier for identifying an advertisement related to an item attached with a radio tag, from the radio tag, the advertisement identifier being written to the radio tag by a radio-tag management device that manages information on a plurality of radio tags, requests issue of the advertisement identifier to an advertisement management device which manages the advertisement associated with the advertisement identifier, receives the advertisement identifier from the advertisement management device, and stores the advertisement identifier associated with the tag identifier of the radio tag in a storage device of the radio-tag management device;

requesting, to the radio-tag management device by specifying the tag identifier stored in the radio tag, transmission of traceability information and an address of the advertisement management device;

receiving, from the radio-tag management device, the traceability information and the address of the advertisement management device;

requesting, using the address of the advertise management device received, transmission of an advertisement to the advertisement management device; and displaying the advertisement received from the advertisement management device along with the traceability information.

18. An apparatus comprising:

a reading unit that reads a tag identifier and an advertisement identifier for identifying an advertisement related to an item attached with a radio tag, from the radio tag, the advertisement identifier being written to the radio tag by a radio-tag management device that manages information on a plurality of radio tags, requests issue of the advertisement identifier to an advertisement management device which manages the advertisement associated with the advertisement identifier, receives the advertisement identifier from the advertisement management device, and stores the advertisement identifier associated with the tag identifier of the radio tag in a storage device of the radio-tag management device;

a first requesting unit that requests, to the radio-tag management device by specifying the tag identifier stored in the radio tag, transmission of traceability information and an address of the advertisement management device;

a receiving unit that receives, from the radio-tag management device, the traceability information and the address of the advertisement management device;

a second requesting unit that requests, using the address of the advertise management device received, transmission of an advertisement to the advertisement management device; and a displaying unit that displays the advertisement received from the advertisement management device along with the traceability information.

19. A method of using a radio tag, comprising:

a radio-tag management device, which manages information on a plurality of radio tags, requesting issue of an advertisement identifier to an advertisement management device which manages an advertisement associated with the advertisement identifier;

the advertisement management device issuing the advertisement identifier for identifying the advertisement;

the radio-tag management device receiving the advertisement identifier from the advertisement management device, storing the advertisement identifier associated with a tag identifier of the radio tag in a storage device of the radio-tag management device, and writing the advertisement identifier to the radio tag; and the user's terminal reading the tag identifier and the advertisement identifier written to the radio tag at the writing, requesting, to the radio-tag management device by specifying the tag identifier stored in the radio tag, transmission of traceability information and an address of the advertisement management device, receiving, from the radio-tag management device, the traceability information and the address of the advertisement management device, requesting, using the address of the advertise management device received, transmission of an advertisement to the advertisement management device, receiving the advertisement corresponding to the advertisement identifier from the advertisement management device, and displaying the advertisement together with the traceability information, the user's terminal being used by a purchaser of an item attached with the radio tag.

* * * * *